US00RE50139E

(19) United States
(12) Reissued Patent
Andre et al.

(10) Patent Number: US RE50,139 E
(45) Date of Reissued Patent: Sep. 24, 2024

(54) COMPUTING DEVICE

(71) Applicant: Apple Inc., Cupertino, CA (US)

(72) Inventors: Bartley K. Andre, Palo Alto, CA (US); Daniel J. Coster, San Francisco, CA (US); Daniele De Iuliis, San Francisco, CA (US); Richard P. Howarth, San Francisco, CA (US); Jonathan P. Ive, San Francisco, CA (US); Steven P. Jobs, Palo Alto, CA (US); Duncan Robert Kerr, San Francisco, CA (US); Shin Nishibori, Kailua, HI (US); Matthew Dean Rohrbach, San Francisco, CA (US); Douglas B. Satzger, Menlo Park, CA (US); Calvin Q. Seid, Palo Alto, CA (US); Christopher J. Stringer, Woodside, CA (US); Eugene Antony Whang, San Francisco, CA (US); Rico Zörkendörfer, San Francisco, CA (US)

(73) Assignee: Apple Inc., Cupertino, CA (US)

(21) Appl. No.: 29/884,990

(22) Filed: Feb. 17, 2023

Related U.S. Patent Documents

Reissue of:
(64) Patent No.: Des. 741,316
Issued: Oct. 20, 2015
Appl. No.: 29/489,648
Filed: May 1, 2014

U.S. Applications:
(60) Continuation of application No. 29/810,348, filed on Oct. 4, 2021, now Pat. No. Re. 49,429, which is a
(Continued)

(51) LOC (14) Cl. ..... 14-02
(52) U.S. Cl.
USPC ..... D14/315

(58) Field of Classification Search
USPC ..... D14/315–327; D18/1, 2, 7, 11
(Continued)

(56) References Cited

U.S. PATENT DOCUMENTS

D416,238 S 11/1999 Irie et al. ..... D14/318
6,067,224 A 5/2000 Nobuchi ..... G06F 1/1688 381/87

(Continued)

OTHER PUBLICATIONS

Apple PowerBook G4 Titanium, available at least as early as Jan. 1, 2001.

(Continued)

*Primary Examiner* — Darlington Ly
(74) *Attorney, Agent, or Firm* — Saidman DesignLaw Group, LLC

(57) CLAIM

The ornamental design for a computing device, as shown and described.

DESCRIPTION

[FIG. 1 is a perspective view of a computing device showing our new design;]
[FIG. 2 is a top view thereof; and,]
[FIG. 3 is a front view thereof, showing the computing device in a closed position.]
*FIG. 4 is perspective view of a computing device showing our new design;*
*FIG. 5 is a top plan view thereof;*
*FIG. 6 is a side elevation view thereof;*
*FIG. 7 is a front elevation view thereof;*
*FIG. 8 is a rear elevation view thereof.*
The broken lines illustrate environmental structure which forms no part of the claimed design.

1 Claim, 5 Drawing Sheets

Matter enclosed in heavy brackets [ ] appears in the original patent but forms no part of this reissue; matter printed in italics indicates the additions made by reissue.

(NEW)

(NEW)

Related U.S. Application Data continuation of application No. 29/704,971, filed on Sep. 9, 2019, now Pat. No. Re. 48,762, which is a division of application No. 29/622,909, filed on Oct. 20, 2017, now Pat. No. Re. 47,664, which is an application for the reissue of Pat. No. Des. 741,316, which is a continuation of application No. 29/412,855, filed on Feb. 8, 2012, now Pat. No. Des. 708,174, which is a continuation of application No. 29/400,286, filed on Aug. 25, 2011, now Pat. No. Des. 655,703, which is a continuation of application No. 29/391,635, filed on May 11, 2011, now Pat. No. Des. 645,860, which is a continuation of application No. 29/365,032, filed on Jul. 1, 2010, now Pat. No. Des. 639,295, which is a continuation of application No. 29/354,258, filed on Jan. 21, 2010, now Pat. No. Des. 621,409, which is a continuation of application No. 29/321,731, filed on Jul. 22, 2008, now Pat. No. Des. 612,844, which is a continuation of application No. 29/296,887, filed on Oct. 30, 2007, now Pat. No. Des. 574,378, which is a continuation of application No. 29/259,461, filed on May 8, 2006, now Pat. No. Des. 558,753.

(58) Field of Classification Search

CPC ..... G06F 1/16; G06F 1/1616; G09B 13/04; H01R 35/02; H03K 17/94; H03M 11/00

See application file for complete search history.

(56) References Cited

U.S. PATENT DOCUMENTS

| | | | | |
|---|---|---|---|---|
| 6,166,737 | A | 12/2000 | Lee et al. | G06F 3/04892 345/173 |
| D463,797 | S | 10/2002 | Andre et al. | D14/327 |
| 6,657,854 | B2 | 12/2003 | Horii et al. | G06F 1/1671 362/253 |
| D491,177 | S | 6/2004 | Andre et al. | D14/318 |
| D493,785 | S | 8/2004 | Andre et al. | D14/318 |
| 6,771,494 | B2 * | 8/2004 | Shimano | G06F 1/1616 345/905 |
| D513,509 | S | 1/2006 | Kawa | D14/318 |
| 7,035,665 | B2 | 4/2006 | Kido et al. | G06F 1/1616 455/575.8 |
| D527,730 | S | 9/2006 | Dong | D14/315 |
| D529,907 | S | 10/2006 | Dong | D14/315 |
| D547,310 | S | 7/2007 | Yoon | D14/315 |
| D556,192 | S | 11/2007 | Jeong | D14/327 |
| D558,752 | S | 1/2008 | Andre et al. | D14/315 |
| D558,753 | S | 1/2008 | Andre et al. | G06F 1/1679 D14/315 |
| D571,364 | S | 6/2008 | Andre et al. | D14/315 |
| D572,247 | S | 7/2008 | Andre et al. | D14/315 |
| D574,378 | S | 8/2008 | Andre et al. | G06F 1/1679 D14/315 |
| D589,507 | S | 3/2009 | Andre et al. | D14/315 |
| D604,294 | S | 11/2009 | Andre et al. | D14/318 |
| D611,045 | S | 3/2010 | Andre et al. | |
| D611,469 | S | 3/2010 | Andre et al. | D14/315 |
| D616,881 | S | 6/2010 | Andre et al. | D14/318 |
| D617,789 | S | 6/2010 | Akana et al. | |
| D623,645 | S | 9/2010 | Andre et al. | |
| D625,717 | S | 10/2010 | Andre et al. | D14/318 |
| D633,087 | S | 2/2011 | Andre et al. | D14/315 |
| D635,566 | S | 4/2011 | Andre et al. | D14/455 |
| D639,295 | S | 6/2011 | Andre et al. | G06F 1/1616 D14/455 |
| D661,296 | S | 6/2012 | Akana et al. | |
| D676,438 | S | 2/2013 | Akana et al. | |
| D682,821 | S | 5/2013 | Kim et al. | |
| D686,205 | S | 7/2013 | Akana et al. | |
| D708,176 | S | 7/2014 | Akana et al. | |
| D708,179 | S | 7/2014 | Andre et al. | |
| D723,539 | S | 3/2015 | Andre et al. | |
| D763,249 | S | 8/2016 | Lee et al. | |
| D766,233 | S | 9/2016 | Lam et al. | |
| D768,619 | S | 10/2016 | Akana et al. | |
| D774,505 | S * | 12/2016 | Akana | D14/318 |
| D776,107 | S * | 1/2017 | Akana | D14/318 |
| D776,653 | S * | 1/2017 | Akana | D14/318 |
| D787,500 | S * | 5/2017 | Akana | D14/315 |
| D803,825 | S * | 11/2017 | Akana | D14/315 |
| D806,700 | S * | 1/2018 | Akana | D14/315 |
| D806,701 | S * | 1/2018 | Akana | D14/315 |
| D812,604 | S * | 3/2018 | Akana | D14/315 |
| D813,224 | S * | 3/2018 | Akana | D14/315 |
| D813,225 | S * | 3/2018 | Akana | D14/315 |
| D813,226 | S * | 3/2018 | Akana | D14/315 |
| D816,661 | S * | 5/2018 | Akana | D14/315 |
| D819,017 | S * | 5/2018 | Akana | D14/318 |
| D820,826 | S | 6/2018 | Bowers et al. | |
| D820,829 | S | 6/2018 | Wang et al. | |
| D825,552 | S | 8/2018 | Andre et al. | |
| 10,228,721 | B2 | 3/2019 | Farahani et al. | |
| D864,948 | S | 10/2019 | Yoshida et al. | |
| D888,048 | S | 6/2020 | Akana et al. | |
| 2005/0018396 | A1 | 1/2005 | Nakajima et al. | G06F 1/1616 361/679.08 |
| 2005/0041378 | A1 | 2/2005 | Hamada et al. | G06F 1/1656 361/679.01 |
| 2009/0040708 | A1 | 2/2009 | Tatsukami et al. | |
| 2010/0091442 | A1 | 4/2010 | Andre et al. | |
| 2011/0182015 | A1 | 7/2011 | Chen et al. | |
| 2011/0255727 | A1 | 10/2011 | Azuchi | |
| 2012/0099264 | A1 * | 4/2012 | Degner et al. | G06F 1/1616 361/679.09 |
| 2013/0327556 | A1 | 12/2013 | Casebolt et al. | |
| 2013/0329359 | A1 * | 12/2013 | Andre et al. | G06F 1/1613 361/679.55 |

OTHER PUBLICATIONS

Apple PowerBook G4 Aluminum, available at least as early as Jan. 1, 2003.

Apple MacBook Pro, available at least as early as Jan. 10, 2006.

Apple MacBook Air, available Jan. 15, 2008, http://images.apple.com/macbookair/images/design_gal01_20080115.jpg.

Apple MacBook Air, available Jan. 15, 2008, http://images.apple.com/macbookair/images/design_gal02_20080115.jpg.

Apple MacBook Air, available Jan. 15, 2008, http://images.apple.com/macbookair/images/design_gal03_20080115.jpg.

Apple MacBook Air, available Jan. 15, 2008, http://images.apple.com/macbookair/images/design_gal04_20080115.jpg.

Apple MacBook Air, available Jan. 15, 2008, http://images.apple.com/macbookair/images/design_thinair20080115.

Apple MacBook Air, available Jan. 15, 2008, http://images.apple.com/macbookair/images/design_displayair20080115.jpg.

Apple MacBook Air, available Jan. 15, 2008, http://images.apple.com/macbookair/images/design_keyboardair20080115.jpg.

Apple MacBook Air, available Jan. 15, 2008, http://images.apple.com/macbookair/images/design_gal08_20080115.jpg.

U.S. Appl. No. 29/459,366 of Bartley K. Andre et al. filed Jun. 28, 2013.

U.S. Appl. No. 29/459,559 of Bartley K. Andre et al. filed Jul. 1, 2013.

* cited by examiner

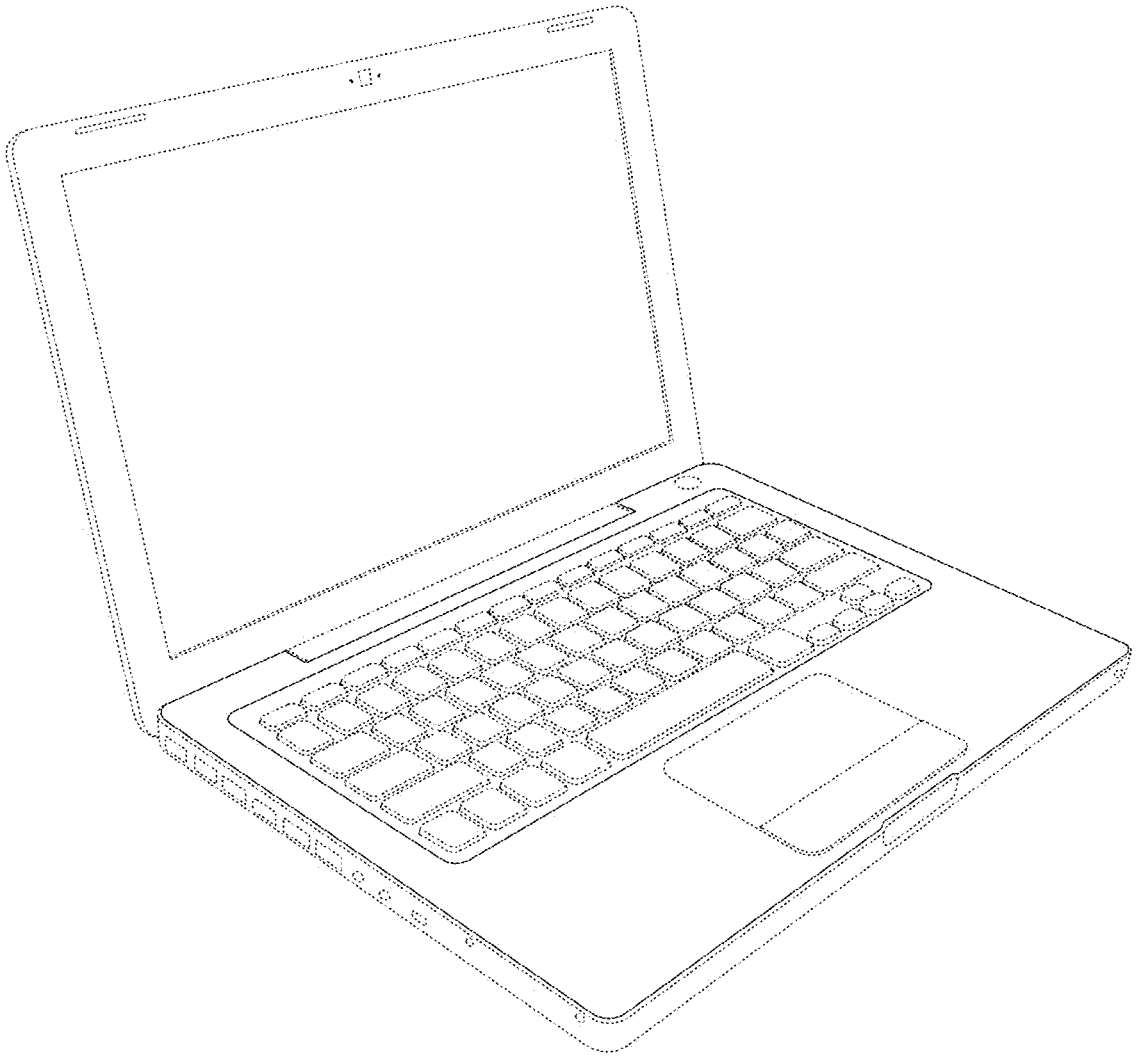
*Fig. 4*
*(NEW)*

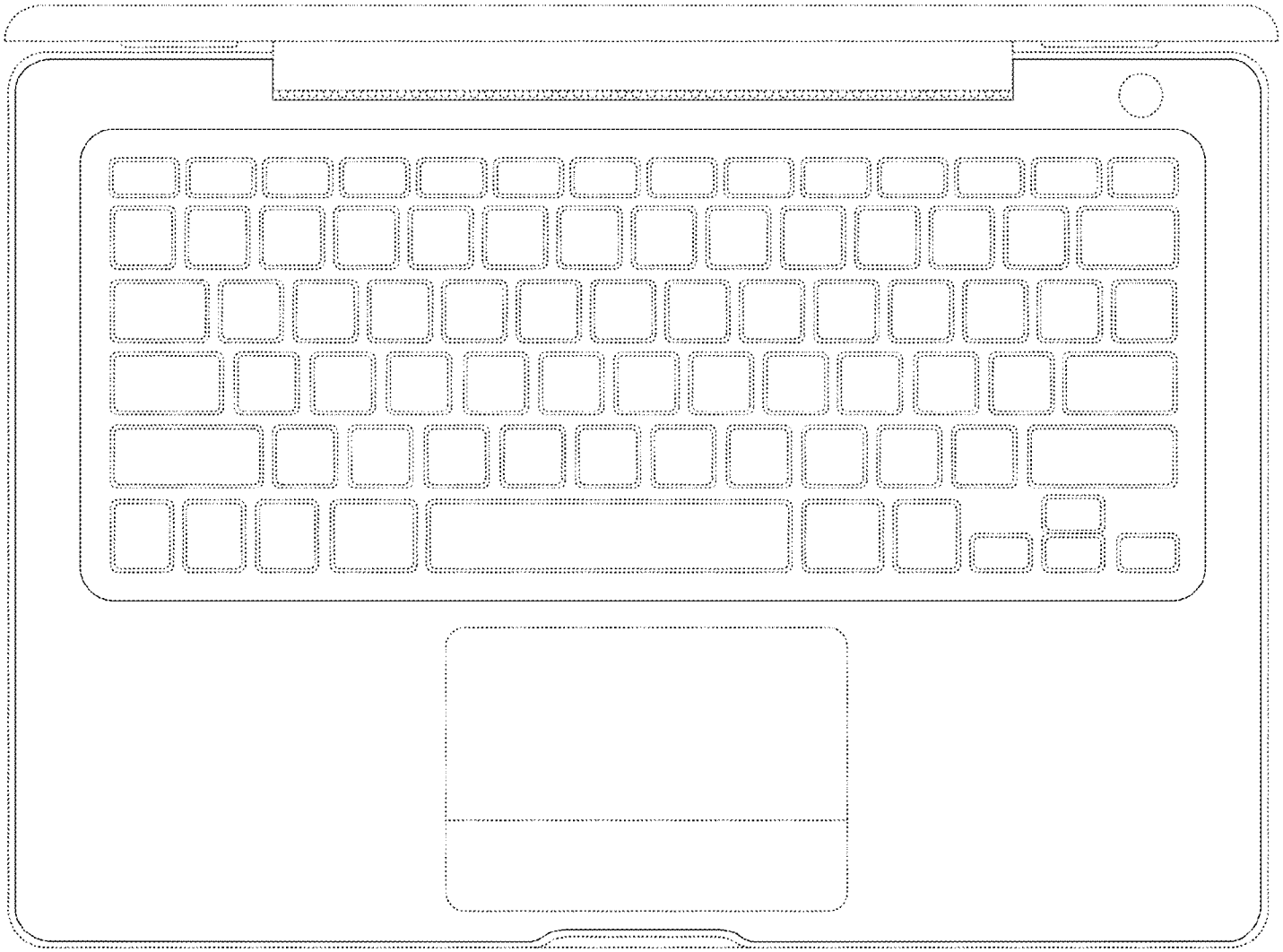
Fig. 5
(NEW)

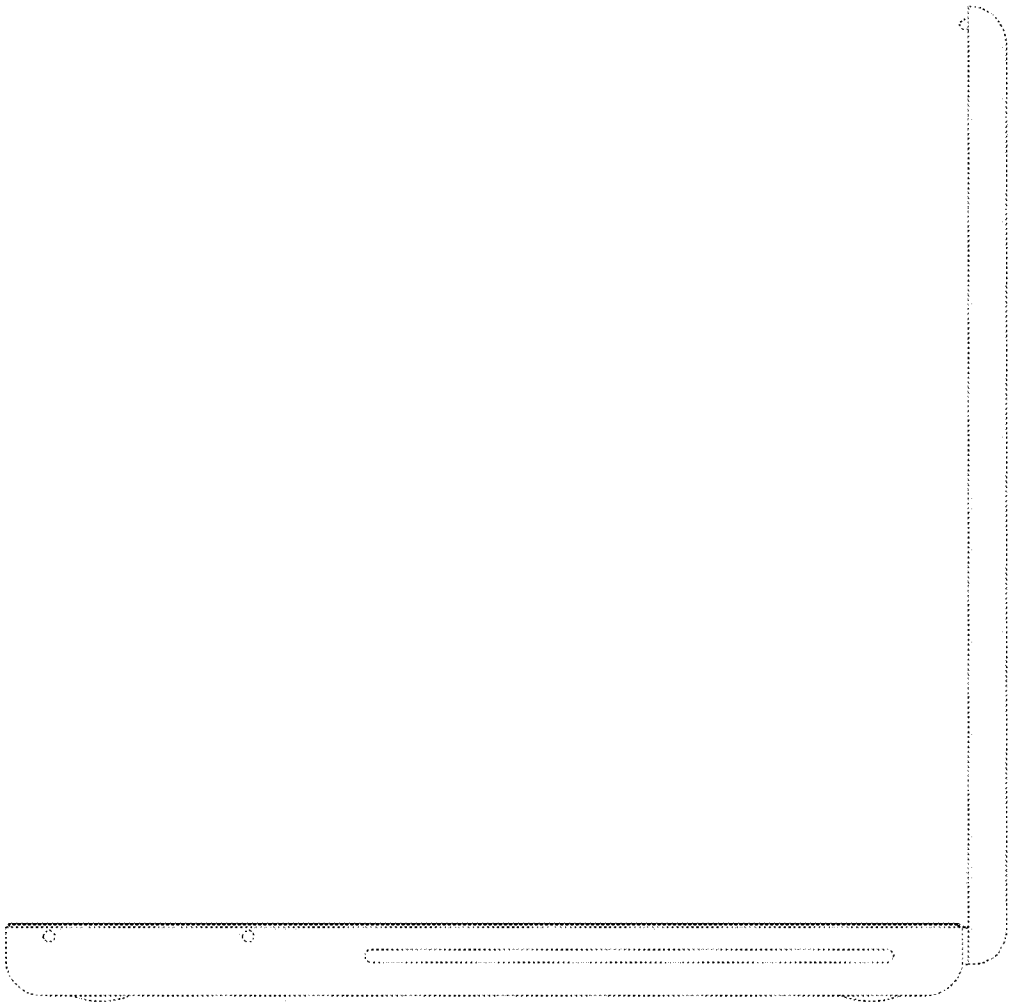
Fig. 6
(NEW)

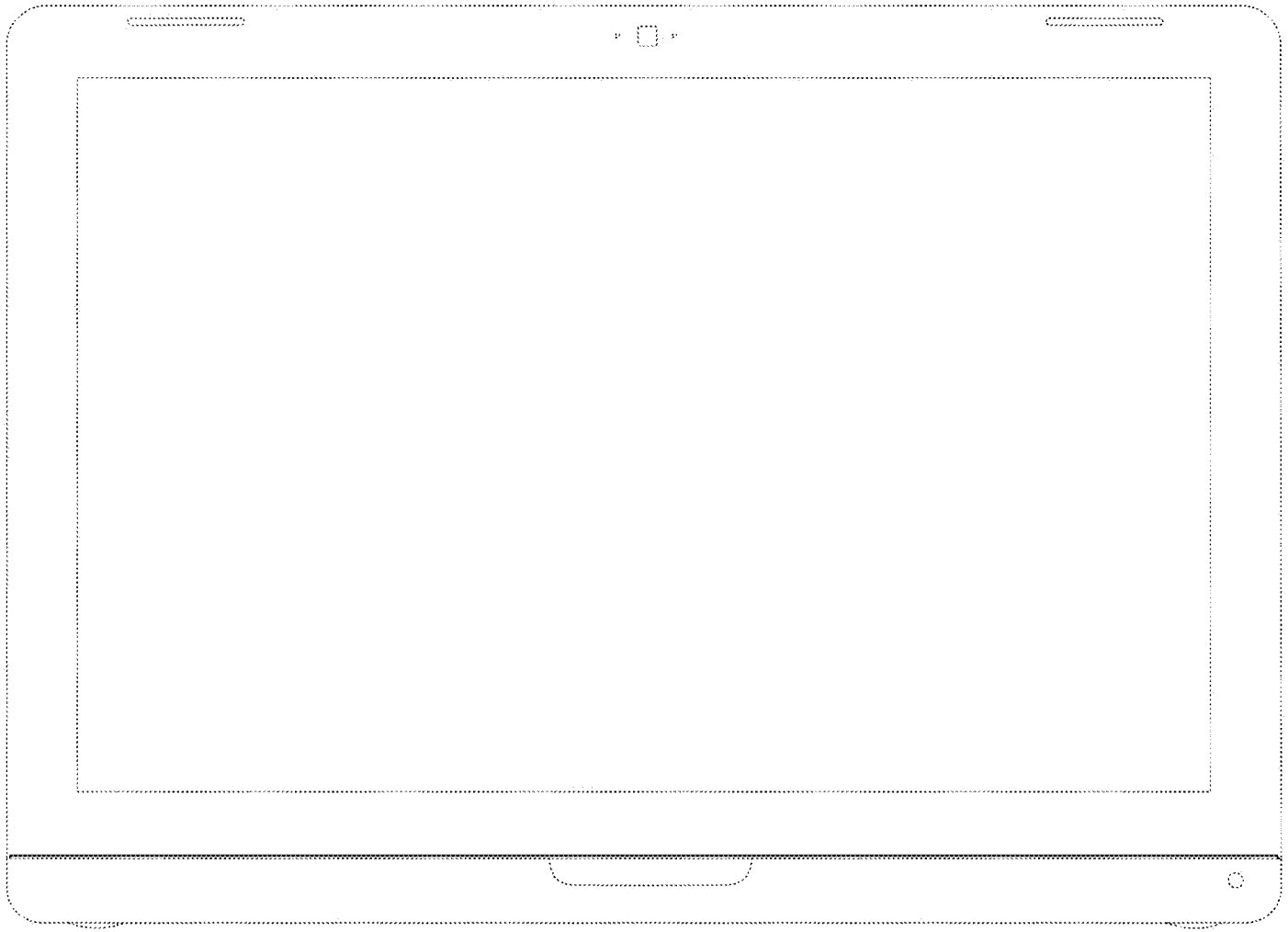
Fig. 7
(NEW)

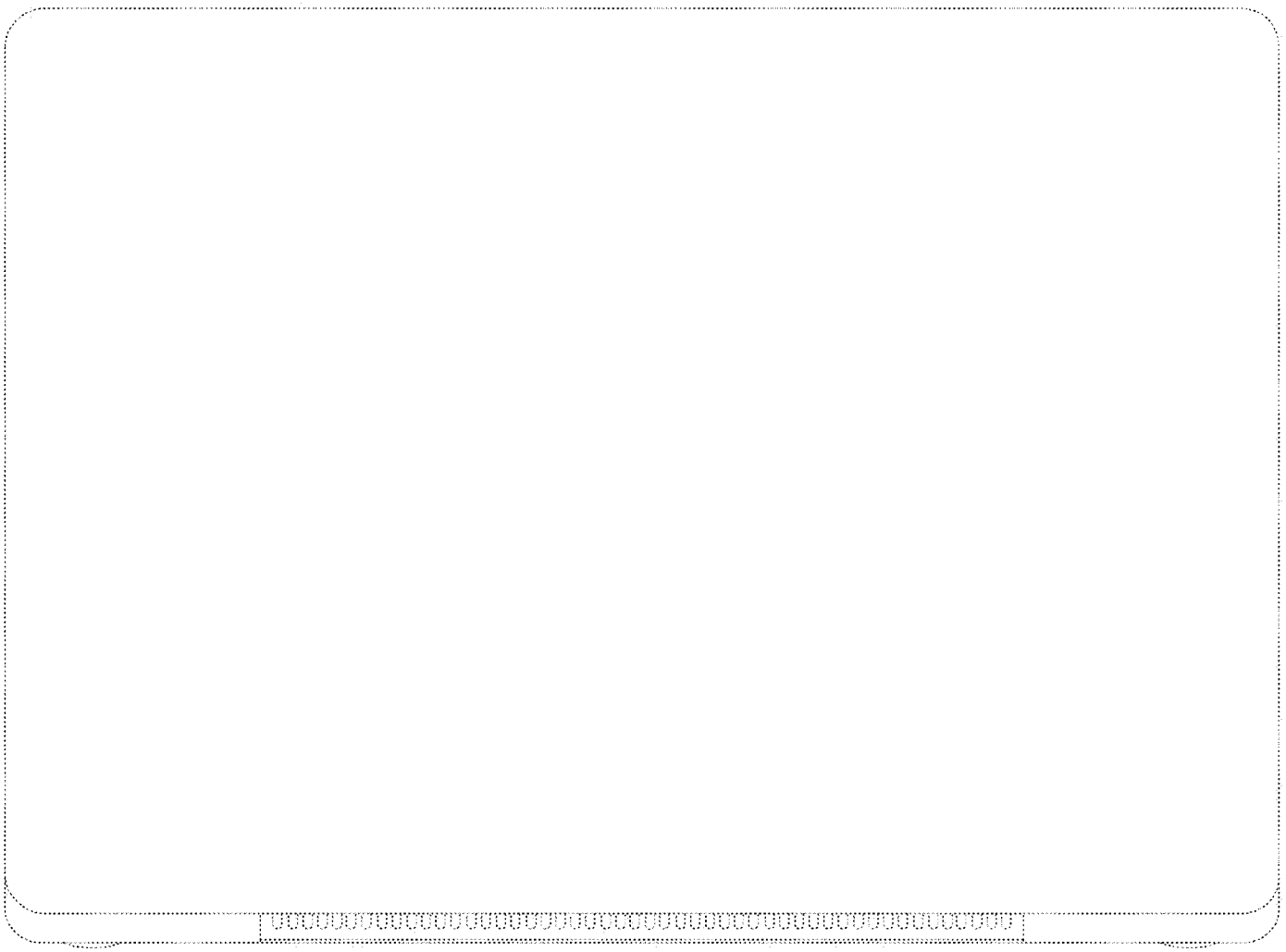
Fig. 8
(NEW)